United States Patent

Orzel

[11] 3,930,686
[45] Jan. 6, 1976

[54] AIR BRAKE BLEND BACK PROPORTIONING VALVE

[75] Inventor: Edward S. Orzel, Cleveland, Ohio

[73] Assignee: The Weatherhead Company, Cleveland, Ohio

[22] Filed: May 31, 1974

[21] Appl. No.: 475,059

[52] U.S. Cl. .............................. 303/6 C; 188/349
[51] Int. Cl.² ........................................ B60T 15/36
[58] Field of Search ............... 303/6 C, 6 R, 22, ; 188/349; 137/493, 494

[56] References Cited
UNITED STATES PATENTS

| | | | |
|---|---|---|---|
| 3,011,833 | 12/1961 | Stelzer | 303/22 R |
| 3,228,731 | 1/1966 | Valentine | 303/22 R |
| 3,428,071 | 2/1969 | Kobnick | 303/6 C |
| 3,473,849 | 10/1969 | Smith et al. | 303/6 C |
| 3,653,722 | 7/1970 | Klimek | 303/6 C |

Primary Examiner—Trygve M. Blix
Assistant Examiner—Douglas C. Butler
Attorney, Agent, or Firm—McNenny, Farrington, Pearne & Gordon

[57] ABSTRACT

A motor vehicle air brake system includes a blend back proportioning valve which reduces brake sensitivity at low braking pressures and which allows full braking at high braking pressures.

9 Claims, 3 Drawing Figures

AIR BRAKE BLEND BACK PROPORTIONING VALVE

BACKGROUND AND SUMMARY OF THE INVENTION

Modern motor vehicle air brake systems, and particularly such systems as are used on large trucks, provide greater braking capacity than systems provided in the past. Although this increased capacity provides better braking characteristics for heavily loaded vehicles, this increased capacity also increases the sensitivity of the brakes during stopping of a lightly loaded vehicle. This makes it more difficult for the operator to execute a smooth stop, particularly at lower speeds, with a lightly loaded vehicle.

Prior art brake systems have included air brake blend back proportioning valves (that is, valves which provide an outlet pressure proportionally reduced from the inlet pressure at lower braking pressures and which blend back or equalize inlet and outlet presures pressures higher braking pressures), including those shown in U.S. Pat. Nos. 3,428,071 and 3,492,052.

The present invention departs from the structure and mode of operation of prior art braking systems by providing a novel braking system which includes a novel blend back proportioning valve having a housing with an inlet port and an outlet port. A shuttle piston is slidably disposed in the housing, and an outlet diaphragm includes a radially outer portion secured to the housing and a radially inner portion secured to the shuttle piston. At low braking pressures, the diaphragm has a predetermined lateral cross-sectional area exposed to outlet pressure and acting against the shuttle piston so that the shuttle piston acts as a differential area piston to provide proportional but smaller increases in outlet port pressure with respect to inlet port pressure. At higher braking pressures, the lateral cross-sectional area of the outlet diaphragm exposed to outlet pressure and acting against the shuttle piston is reduced to change the proportioning ratio of the valve and equalize inlet and outlet pressures.

BRIEF DESCRIPTION OF THE DRAWINGS

These and other novel structural and functional aspects of the invention are incorporated in the preferred embodiment of the invention shown in the drawings, wherein.

DETAILED DESCRIPTION OF THE DRAWINGS

Figure 1:
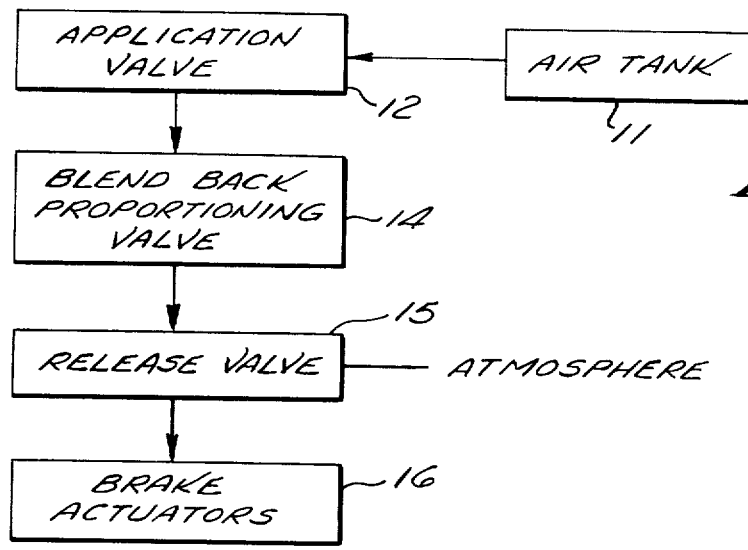
FIG. 1 is a schematic view of a motor vehicle fluid pressure braking system incorporating the blend back proportioning valve of this invention.

Referring now to the drawings in greater detail, FIG. 1 shows a motor vehicle air brake system which is particularly adapted for use on large trucks. The system includes a conventional air tank 11 which provides a source of high pressure air and which is pressurized by a pump (not shown in the drawings). The air tank 11 is connected to a conventional application valve 12 which is actuatable by the operator of the vehicle to apply or release the brakes of the vehicle.

The application valve 12 supplies air from the tank 11 to a blend back proportioning valve 14 which is described in detail below with reference to FIGS. 2 and 3. Air from the outlet of the blend back proportioning valve 14 is then supplied to a conventional release valve 15 and then to conventional brake actuators 16. The release valve 15, in a well-known manner, provides a flow path to the brake actuators 16 when air is being supplied to actuate the brakes of the vehicle, and provides a flow path from the brake actuators 16 to the atmosphere when the air supplied to the release valve 15 is released so that the air in the brake actuators 16 is also released. The air tank 11, application valve 12, release valve 15, and brake actuators 16 are all conventional and are well-known in the art.

Figure 2:
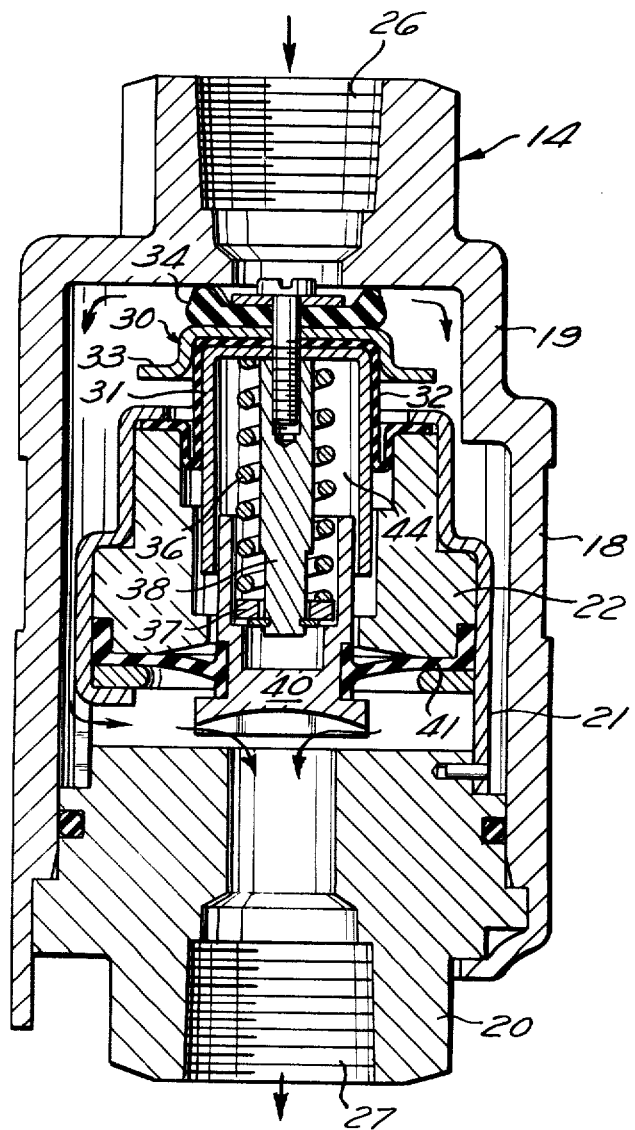
FIG. 2 is a lateral cross-sectional view of the blend back proportioning valve utilized in the system shown in FIG. 1.

Referring now to FIG. 2, the structural details of the blend back proportioning valve 14 are shown. The proportioning valve 14 includes a multiple piece housing 18 which includes a cup shaped cylindrical portion 19 and a plug portion 20. The housing 18 also includes a support portion 21 and a carrier portion 22. The various portions 19, 20, 21 and 22 of the housing 18 are made of separate parts for ease of manufacture and assembly. The housing 18 includes an inlet port 26 which is connected for receiving air from the application valve 12 and an outlet port 27 which is connected for supplying air to the release valve 15.

A multiple piece shuttle piston 30 is slidably disposed within the carrier 22 of the housing 18. The shuttle piston 30 includes a cylindrical cup shaped inlet portion 31 which is secured to the housing carrier portion 22 by a rolling bellows type seal 32 which prevents fluid leakage between the shuttle piston inlet portion 31 and the housing carrier portion 22. The inlet portion 31 also includes a stop member 33 which limits downward travel of the shuttle piston inlet portion 31 by engagement with the top surface of the housing support portion 21 and an elastomeric disc shaped valve member 34 which cooperates with the housing 18 to open and close pressure communication between the inlet port 26 and outlet port 27. The shuttle piston inlet portion 31 also includes a preloaded compression spring 36 which exerts a predetermined preload force on an annular washer 37 which is held in place by a suitable snap ring on the end of a spring carrier 38.

Still referring to FIG. 2, the shuttle piston 30 also includes a single piece cup shaped outlet portion 40. The outlet portion 40 is secured to the housing carrier portion 22 by a resilient elastomeric annular diaphragm seal 41. As explained below, the shuttle piston inlet and outlet portions 31 and 40 are axially movable with respect to the housing carrier portion 22 and with respect to each other.

A sealed reference pressure chamber 44 is defined by the seals 32 and 41. The reference pressure chamber 44 is isolated from the pressure in the inlet port 26 and in the outlet port 27. The pressure in the reference chamber 44 may be considered as being atmospheric pressure, although such pressure may vary slightly from atmospheric pressure depending upon the temperature of the air within the chamber 44. However, because the volume of the chamber 44 is relatively small, such changes in pressure will not be of sufficient magnitude to substantially affect the operation of the valve. During operation of the valve 14, a predetermined lateral cross-sectional area of the shuttle piston inlet portion 31 and a predetermined lateral cross-sectional area of the shuttle piston outlet portion 40 and seal 41 are exposed to the pressure in the reference chamber 44.

Turning now to the operation of the system shown in the drawings, when the brakes of the vehicle are deactuated the components of the proportioning valve 14 are held in the positions shown in FIG. 2 by the resilience of the seals 32 and 41. With the proportioning valve 14 in this position, the valve member 34 engages its associated surface of the housing 18.

When the air pressure in the inlet port 26 begins to increase as a result of the operator of the motor vehicle actuating the application valve 12 to supply air under pressure to the inlet port 26, the shuttle piston 30 initially moves downwardly to open the valve member 34 and then provides increases in outlet port pressure which are proportional to but less than the increases in inlet port pressure. This is because the multiple piece shuttle piston 30 acts as a differential diameter piston. The force urging the shuttle piston 30 downwardly as viewed in FIG. 2 is equal to the pressure of the inlet port air multiplied times the lateral cross-sectional area of the valve member 34 exposed to inlet port pressure. The force urging the shuttle piston 30 upwardly as viewed in FIG. 2 is equal to the pressure of the outlet port air multiplied times the sum of the lateral cross-sectional area of the outlet portion 40 exposed to outlet port pressure plus the lateral cross-sectional area of the diaphragm seal 41 exposed to outlet port pressure and acting against the outlet portion 40. The sum of the areas exposed to outlet port pressure is greater than the area exposed to inlet port pressure, and the valve member 34 throttles air flow thereacross in order to equalize the product of pressure multiplied times area on the inlet and outlet sides of the valve.

At this point, it should be understood that the diaphragm seal 41 has, in addition to the above mentioned lateral cross-sectional area exposed to outlet port pressure which acts against the outlet portion 40 of the shuttle piston 30, a small area exposed to outlet port pressure acting against the housing carrier portion 22. This area of the diaphragm seal 41 acting against the housing may alternatively be zero during this portion of the operation of the valve. It should also be understood that during this portion of the operation of the proportioning valve 14, the outlet portion 40 moves slightly upwardly as viewed in FIG. 2 and engages the washer 37. Because the spring 36 is provided with a preload, further upward movement of the outlet portion 40 during this portion of the operation is prevented so that the lateral cross-sectional area of the diaphragm seal 41 exposed to outlet port pressure and acting against the outlet portion 40 remains constant.

Figure 3:
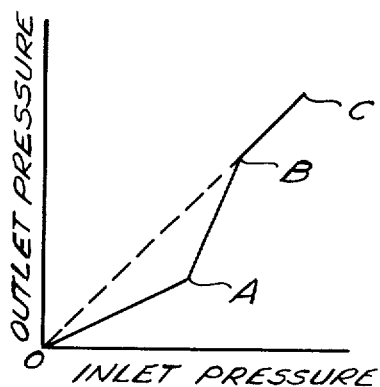
FIG. 3 is a graphical representation of the relationship between inlet and outlet pressures for the blend back proportioning valve shown in FIGS. 1 and 2.

This portion of the operation of the proportioning valve 14 is shown by line OA in FIG. 3. Line OA shows that, as the pressure in the inlet port 26 increases, the pressure in the outlet port 27 increases by a proportional but smaller magnitude. In this manner, during low braking pressures such as occur during low speed stops of a lightly loaded vehicle, the outlet pressure supplied to the brake actuators 16 is reduced to decrease the sensitivity of the brakes to enable the operator to execute a smooth stop.

When the inlet and outlet pressures indicated at point A are reached, the force created on the outlet portion 40 by the outlet pressure acting on the sum of the area of the outlet portion 40 exposed to outlet pressure plus the area of the diaphragm 41 exposed to outlet pressure and acting against the outlet portion 40 is sufficient to overcome the preload of the spring 36. When this occurs, the outlet portion 40 of the shuttle piston 30 moves upwardly as viewed in FIG. 2 relative to the inlet portion 31. This causes the diaphragm seal 41 to also move upwardly so that a greater portion of the area of the diaphragm seal 41 engages the housing carrier 22. In this manner, when the predetermined inlet and outlet pressures indicated at point A in FIG. 3 are reached, the lateral cross-sectional area of the diaphragm 41 exposed to outlet port pressure and acting against the outlet portion 40 of the shuttle piston 30 is decreased while the lateral cross-sectional area of the diaphragm 41 exposed to outlet port pressure and acting against the housing carrier portion 22 is increased. If desired, the lateral cross-sectional area of the diaphragm 41 exposed to outlet pressure and acting against the outlet portion 40 may be reduced to zero during this portion of the operation of the proportioning valve.

As the pressure in the inlet port 26 continues to increase above point A, the shuttle piston 30 begins to equalize inlet and outlet port pressures. This is because the area of the valve member 34 exposed to inlet port pressure is greater than the sum of the area of the outlet portion 40 exposed to outlet pressure plus the reduced area of the diaphragm seal 41 exposed to outlet pressure acting against the outlet portion 40.

This portion of the operation of the valve is shown by line AB in FIG. 3 and continues until point B is reached, at which point the inlet pressure is equal to the outlet pressure. The equalized pressures acting on the inlet and outlet sides of the shuttle piston 30 then maintain the shuttle piston 30 in its lower position shown in FIG. 2 to permit unrestricted application of air pressure through the proportioning valve 14 at pressures above point B.

Although the operation of the blend back proportioning valve 14 has been described and illustrated in FIG. 3 as occuring along straight lines with sharp corners at points A and B, in actual practice the friction of the seals and the spring rate of the spring 36 (that is, the dynamic characteristics of the proportioning valve 14), provide a gradual rather than an instantaneous transition from the slope of line OA to the slope of line AB and from the slope of line AB to the slope of line BC during actual operation of the valve.

When point C is reached and the operator of the vehicle desires to release the brakes, the application valve is deactuated to decrease the supply of air to the proportioning valve 14. This decrease in pressure provided to the release valve 15 causes the release valve to vent the brake actuators 16 to atmosphere in a well-known manner to release the brakes of the vehicle. This releases the pressure in the outlet port 27 and causes the inlet and outlet pressures of the blend back proportioning valve 14 to return to zero.

What is claimed is:

1. A fluid pressure proportioning valve comprising a housing having an inlet port and an outlet port, a shuttle piston slidably disposed in said housing, said shuttle piston having an inlet portion and an outlet portion, said inlet portion carrying a valve member movable between an open position and a closed position for throttling flow from said inlet port to said outlet port to control increases in pressure in said outlet port in response to increases in pressure in said inlet port, said inlet portion having a predetermined lateral cross-sectional inlet area exposed to inlet port pressure under all conditions, an outlet diaphragm having a predetermined lateral cross-sectional outlet area exposed to outlet pressure under all conditions, said outlet diaphragm having a radially outer portion secured to said housing and a radially inner portion secured to and acting against said outlet portion, said outlet portion being in a rest position and said outlet diaphragm having a first predetermined lateral cross-sectional area of its outlet area of at least zero acting against said housing and a second predetermined lateral cross-sectional area of its outlet area exceeding zero acting against said outlet portion when said outlet port pressure is greater than zero and less than a first predetermined pressure, said inlet and outlet portions being constructed and arranged to move said valve member between said open position and said closed position to maintain increases in outlet port pressure proportional to but less than increases in inlet port pressure when said outlet port pressure is greater than zero and less than said first predetermined pressure, said outlet diaphragm having a third predetermined lateral cross-sectional area of its outlet area greater than said first area acting against said housing when said outlet port pressure is greater than said first predetermined pressure, said outlet portion being axially movable relative to said inlet portion from said rest position to a displaced position to increase said area of said outlet area acting against said housing from said first area to said third area, said outlet portion being in said displaced position when said outlet pressure exceeds said first predetermined pressure, and said inlet and outlet portions being constructed and arranged to move said valve member between said open position and said closed position to maintain increases in outlet port pressure proportional to but greater than increases in inlet port pressure when said outlet port pressure exceeds said first predetermined pressure.

2. A fluid pressure proportioning valve as defined in claim 1 including a spring carried by one of said inlet and outlet portions, and said outlet portion being biased by said spring toward said rest position when said outlet pressure is less than said first predetermined pressure.

3. A fluid pressure proportioning valve as defined in claim 2 wherein said spring is preloaded to prevent movement of said outlet portion from said rest position to said displaced position when said outlet pressure is less than said first predetermined pressure.

4. A fluid pressure proportioning valve as defined in claim 3 wherein said outlet portion includes abutment means engaging said spring and moving against the preload of said spring when said outlet port pressure is greater than said first predetermined pressure.

5. A fluid pressure proportioning valve as defined in claim 1 wherein said inlet portion and said outlet portion cooperatively define a reference pressure chamber, and said reference pressure chamber is isolated from said inlet pressure and from said outlet pressure under all conditions.

6. A fluid pressure proportioning valve as defined in claim 5 wherein said inlet portion and said outlet portion each include a predetermined lateral cross-sectional area exposed to reference chamber pressure.

7. A fluid pressure proportioning valve as defined in claim 1 wherein said valve member is movable to said open position to open communication between said inlet port and said outlet port when said outlet port pressure exceeds another predetermined pressure greater than said first mentioned predetermined pressure, and said inlet portion and said outlet portion are constructed and arranged to maintain increases in outlet port pressure equal to increases in inlet port pressure when said outlet port pressure exceeds said other predetermined pressure.

8. A fluid pressure proportioning valve comprising a housing having an inlet port and an outlet port, a shuttle piston slidably disposed in said housing, said shuttle piston having an inlet end face and an outlet end face, said inlet and outlet end faces each including a diaphragm having a radially outer portion secured to said housing, said inlet and outlet diaphragms being axially spaced apart and cooperatively defining in said housing a reference pressure chamber, said reference pressure chamber being constructed and arranged such that it is isolated from pressure in said inlet port and from pressure in said outlet port under all conditions, said inlet and outlet diaphragms each having one side exposed to the pressure in said reference pressure chamber, said inlet diaphragm having another side which carries a valve surface movable between an open position and a closed position for throttling flow from said inlet port to said outlet port to control increases in pressure in said outlet port in response to increases in pressure in said inlet port, said inlet end face having a predetermined cross-sectional inlet area on said other side of said inlet diaphragm exposed to pressure in said inlet port under all conditions constructed and arranged such that the pressure in said inlet port acting against said inlet area urges said valve surface toward said open position, said outlet diaphragm having another side, said outlet end face having a predetermined cross-sectional outlet area on said other side of said outlet diaphragm exposed to pressure in said outlet port constructed and arranged such that the pressure in said outlet port acting against said outlet area urges said valve surface toward said closed position when said outlet port pressure is less than a predetermined pressure, said outlet area being axially movable relative to said inlet area from a rest position to a displaced position, said outlet area being in said rest position when said outlet port pressure is less than said predetermined pressure, said outlet area being in said displaced position when said outlet pressure exceeds said predetermined pressure, and said outlet area being constructed and arranged such that the pressure in said outlet port acting against said outlet area is inoperative to urge said valve surface toward said closed position but urges said outlet area against said housing when said outlet area is in said displaced position.

9. A fluid pressure proportioning valve as defined in claim 8 including a spring disposed in said reference pressure chamber acting between said inlet area and said outlet area, and said outlet area being biased by said spring toward said rest position when said outlet pressure is less than said predetermined pressures.

* * * * *